April 10, 1945. H. E. HALL 2,373,394
EXPANSIBLE WOOD DOWNSPOUT
Filed Oct. 27, 1943
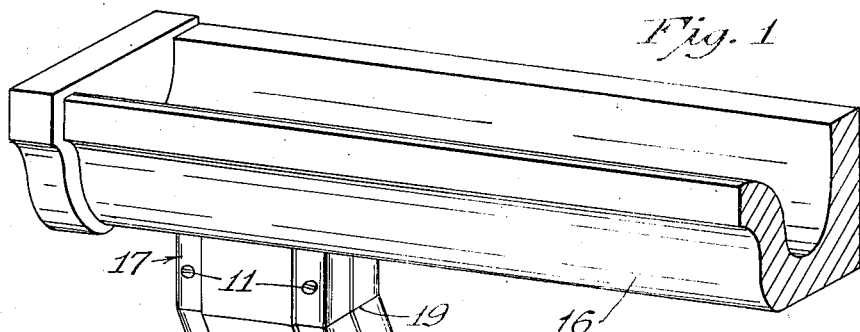
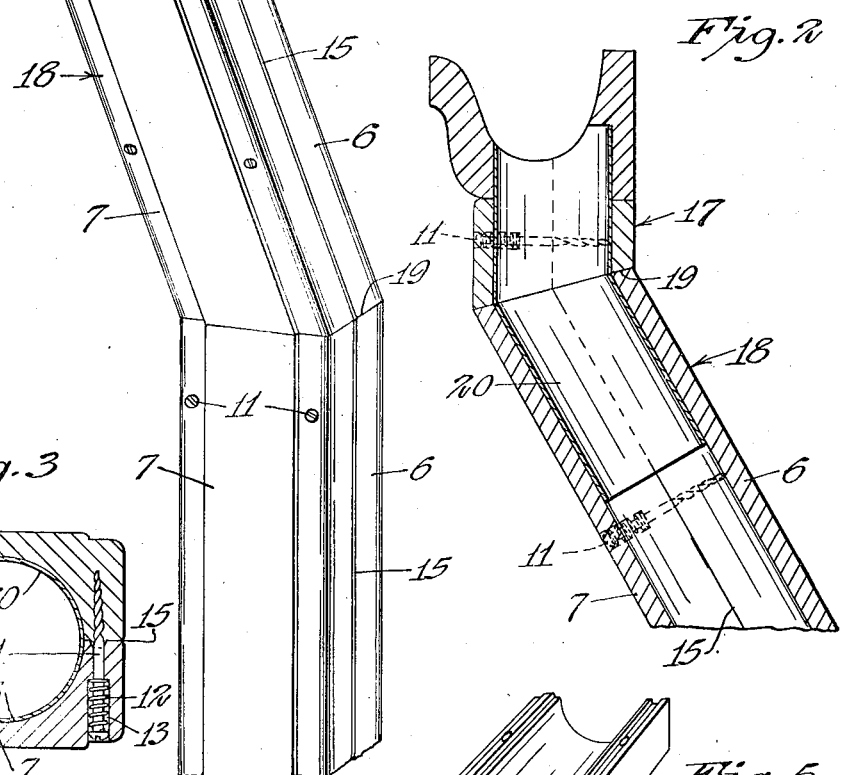
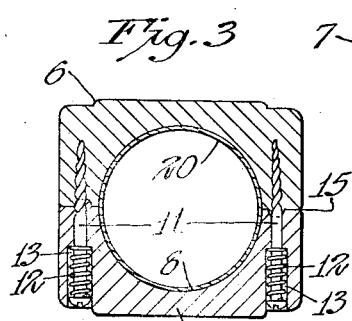
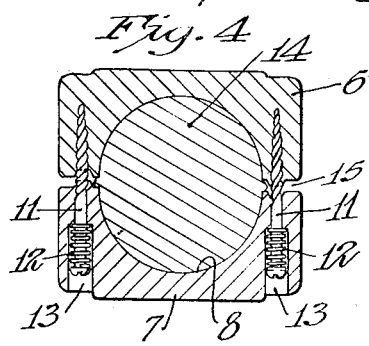
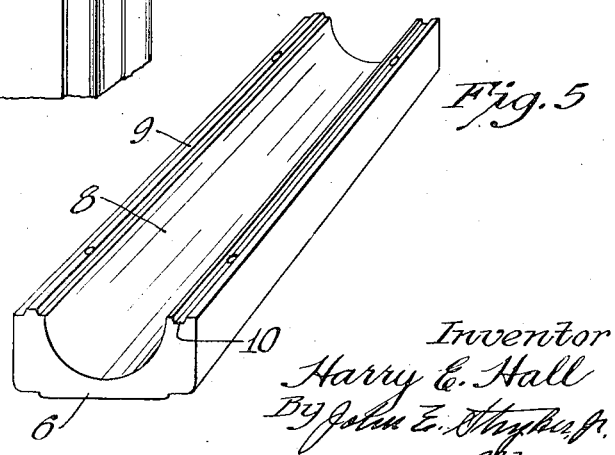
Inventor
Harry E. Hall
By John E. Stryker Jr.
Attorney Patented Apr. 10, 1945

2,373,394

UNITED STATES PATENT OFFICE 2,373,394

EXPANSIBLE WOOD DOWNSPOUT

Harry E. Hall, St. Paul, Minn., assignor to General Timber Service, Inc., St. Paul, Minn., a corporation of Delaware Application October 27, 1943, Serial No. 508,085

3 Claims. (Cl. 138—28)

It is an object of this invention to provide a novel wood downspout which is protected against damage from internal pressures such as those created by the formation of ice in the liquid passage.

A further object is to provide an expansible downspout which is adapted to be formed from two similar pieces of inexpensive, standard stock such as ordinary 2 x 4 members, and wherein the molded component wood members are held together by screws and springs which permit the necessary expansion.

Other objects will appear and be more fully pointed out in the following specification and claims.

Referring to the accompanying drawing:

Figure 1 is an isometric view showing my improved downspout in connection with an ordinary wood gutter and also illustrating simple means for making a downspout connection with a gutter which is offset from the face of a building;

Fig. 2 is a fragmentary, vertical section through a portion of the downspout and offset gutter;

Fig. 3 is a horizontal section through my device near its upper end;

Fig. 4 is a horizontal cross section illustrating the expanded condition of the members which is permitted when my device becomes filled with ice, and Fig. 5 is a perspective view showing a portion of one of the component wood members of my device.

Channel shaped wood members 6 and 7 constitute the principal components of my improved downspout. For conduit sizes up to two and one-half inches in internal diameter, the members 6 and 7 may be molded from 2 x 4 stock. Each of these members has a cylindrical channel 8 extending longitudinally to form half of the internal water passage. The surfaces of the members 6 and 7 which fit together in the assembled conduit are formed with wedge-shaped tongues 9 and grooves 10, extending longitudinally of the members as best shown in Fig. 5. A tongue 9 extends along one edge of the member 6 to fit into a groove in the member 7 and the opposite edge of the member 6 has a wedge shaped groove 10 adapted to receive a similar tongue on the member 7. This construction simplifies the fabrication by making it feasible to use the same machine for shaping the members 6 and 7, these members being identical except as to the drilled holes for fastening devices.

The members 6 and 7 are preferably connected together by the use of pairs of screws 11 extending perpendicularly to the wider faces of these members. Expansion of the downspout along joints 15 is permitted by providing coiled compression springs 12 which are confined on the screws 11 in countersink recesses 13 formed in the member 7. The springs 12 normally hold the joints 15 between the members 6 and 7 closed, with the wedge shaped tongues 9 firmly seated in the grooves 10. This prevents the escape of liquid during the normal use of the downspout. In case the downspout should become filled with ice 14, as indicated in Fig. 4, the necessary expansion of the conduit to relieve excessive internal pressure is permitted by the springs 12 which are compressed under the heads of the screws 11, allowing the longitudinal joints 15 to open, as shown. Upon the melting of the ice, the springs expand and automatically close the side openings.

In the assembly views, Figs. 1 and 2, my improved downspout is shown in connection with a wood gutter 16 and elbows suitable for making the connection with the gutter 16 where the latter is offset from the face of a building wall (not shown). Such elbows may be constructed from short sections 17 and 18 of the downspout having end surfaces cut at oblique angles 19 to fit together end to end, and with the lower end of the section 18 connected to the upper end of the straight section below. It will be evident that the length of the oblique section 18 must be proportioned to the extent of the offset of the gutter from the building face in each installation. Sheet metal elbows 20 (Figs. 2 and 3) are preferably used within each wood elbow to retain the sections in alignment at their ends and to facilitate the making of leak-proof joints. The metal elbows 20 should be sealed in the encasing wood conduits and within the gutter opening by the use of white lead or other sealing composition to prevent leakage at the end joints.

From the foregoing, it will be evident that my improved downspout requires for its construction only simple molding operations on standard wood stock and the fastening means comprising the screws and springs are simple and easy to apply either at the factory or in situ. Since the screws are accessible from the outer face of my device they afford means for opening the water passage for the removal of obstructions which are sometimes allowed to accumulate in conduits of this class. Effective protection against damage from freezing is afforded by my improvements without substantially increasing the cost of the structure as compared with ordinary wood downspouts.

Having described my invention, what I claim as new and desire to protect by Letters Patent is:

1. A downspout comprising a pair of longitudinally extending wood members molded to form a liquid conduit between them, wedge shaped contact surfaces formed on said members and extending longitudinally thereof to coact one with another in sealing the joint between said members, screws loosely connecting said members together and compression springs confined on said screws in countersink recesses in one of said members to normally close the joint between said members, said springs and screws permitting expansion of the conduit under the internal pressure exerted by freezing of the contents.

2. A conduit comprising separable, oppositely disposed longitudinally extending members forming the walls of a conduit and means connecting said members together comprising a plurality of threaded fasteners, each anchored at one end in one of said members and having a shank portion fitting loosely in a countersink recess in the opposite member and a helical spring confined under compression on the shank of each of said fasteners, said springs and fasteners permitting separation of said members under predetermined internal pressure in the conduit.

3. A conduit comprising separable, oppositely disposed, longitudinally extending members forming the walls of a conduit and means connecting said members together comprising a plurality of threaded fasteners, each anchored in one of said members and having a shank portion which is movable in a countersink recess in the opposite member and a helical spring confined under compression on the shank of each of said fasteners, said spring being completely enclosed within said recess and said springs and fasteners permitting expansion of the conduit under the internal pressure exerted by freezing of the contents.

HARRY E. HALL.